(12) United States Patent
Bigelow

(10) Patent No.: US 9,567,116 B2
(45) Date of Patent: *Feb. 14, 2017

(54) DOCKING NODE TRANSPORTER TUG

(71) Applicant: Bigelow Aerospace LLC, Las Vegas, NV (US)

(72) Inventor: Robert T. Bigelow, Las Vegas, NV (US)

(73) Assignee: Bigelow Aerospace, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/120,840

(22) Filed: Jul. 2, 2014

(65) Prior Publication Data

US 2015/0008290 A1    Jan. 8, 2015

Related U.S. Application Data

(60) Provisional application No. 61/957,660, filed on Jul. 8, 2013.

(51) Int. Cl.
*B64G 1/44* (2006.01)
*B64G 1/64* (2006.01)
*B64G 1/40* (2006.01)
*B64G 1/42* (2006.01)
*B64G 1/12* (2006.01)
*B64G 1/26* (2006.01)

(52) U.S. Cl.
CPC ............... *B64G 1/646* (2013.01); *B64G 1/401* (2013.01); *B64G 1/402* (2013.01); *B64G 1/425* (2013.01); *B64G 1/44* (2013.01); *B64G 1/12* (2013.01); *B64G 1/26* (2013.01)

(58) Field of Classification Search
CPC ............... B64G 1/64; B64G 1/22; B64G 1/40; B64G 1/00; B64G 1/646; B64G 1/402; B64G 1/443; B64G 1/401
USPC .................... 244/172.6, 172.4, 171.1, 158.2, 158.1, 244/172.5, 173.3
See application file for complete search history.

(56) References Cited

U.S. PATENT DOCUMENTS

| | | | | |
|---|---|---|---|---|
| 3,891,160 | A * | 6/1975 | Minovitch | 244/171.1 |
| 4,664,343 | A * | 5/1987 | Lofts et al. | 244/171.1 |
| 4,834,325 | A * | 5/1989 | Faget et al. | 244/159.4 |
| 4,964,596 | A * | 10/1990 | Ganssle et al. | 244/172.5 |
| 5,372,340 | A * | 12/1994 | Ihara et al. | 244/172.5 |
| 5,429,328 | A * | 7/1995 | Dobbs et al. | 244/172.5 |
| 5,511,748 | A * | 4/1996 | Scott | 244/172.5 |
| 5,779,195 | A * | 7/1998 | Basuthakur et al. | 244/173.1 |
| 6,017,000 | A * | 1/2000 | Scott | 244/158.6 |
| 6,177,629 | B1 * | 1/2001 | Katz | 136/244 |
| 6,523,784 | B2 * | 2/2003 | Steinsiek et al. | 244/172.4 |
| 7,207,525 | B2 * | 4/2007 | Bischof et al. | 244/172.6 |
| 7,575,200 | B2 * | 8/2009 | Behrens et al. | 244/172.3 |
| 7,861,975 | B2 * | 1/2011 | Behrens et al. | 244/172.5 |
| 2003/0164428 | A1 * | 9/2003 | Anderman et al. | 244/161 |
| 2004/0026571 | A1 * | 2/2004 | Scott | 244/158 R |

(Continued)

OTHER PUBLICATIONS

Dan Roukos, 'Construction of an International Space Transit Vehicle Using the Space Station', 2009, p. 7 and p. 19.*

*Primary Examiner* — Brian M O'Hara
*Assistant Examiner* — Assres H Woldemaryam
(74) *Attorney, Agent, or Firm* — Gibbs & White P.C.; Franklin E. Gibbs

(57) ABSTRACT

A docking node transporter tug is disclosed. The tug can dock with various spacecraft to allow access by people between the spacecraft. Further, the tug may dock with other specialty tugs to form a custom system.

2 Claims, 2 Drawing Sheets

(56) References Cited

U.S. PATENT DOCUMENTS

| | | | |
|---|---|---|---|
| 2004/0031885 A1* | 2/2004 | D'Ausilio et al. | 244/172 |
| 2004/0245407 A1* | 12/2004 | D'Ausilio et al. | 244/172 |
| 2005/0151022 A1* | 7/2005 | D'Ausilio et al. | 244/172 |
| 2006/0278765 A1* | 12/2006 | Strack et al. | 244/172.4 |
| 2007/0040067 A1* | 2/2007 | D'Ausilio et al. | 244/172.5 |
| 2007/0228220 A1* | 10/2007 | Behrens et al. | 244/172.5 |
| 2008/0121759 A1* | 5/2008 | Behrens et al. | 244/172.3 |

* cited by examiner ced under 35 U.S.C. §119 to
DOCKING NODE TRANSPORTER TUG

RELATED APPLICATIONS

This application claims priority under 35 U.S.C. §119 to U.S. Provisional Application No. 61/957,660 filed on Jul. 8, 2013, the contents of which are incorporated herein by reference in its entirety.

FIELD OF THE INVENTION

This invention generally relates to space vehicles that can operate as space tugs for other spacecraft.

BACKGROUND OF THE INVENTION

Space exploration is a rapidly developing field. The types of spacecraft cover a vast range including manned hard shelled space stations, space shuttles, and satellites—to name a few. There are also plans for inflatable spacecraft that can house people. Whether or not the spacecraft is designed for long term accommodations for astronauts, short term occupancy for conducting experiments or repairs, or even a destination for travel, there is a need to have a way of connecting numerous structures to form a space station or conglomeration of structures to address specific mission parameters.

It would be useful if elements of a space station could be added or detached depending upon mission requirements. Thus, a tug having a multiple access point docking node would be invaluable for attaching several habitable crafts together. Should the mission parameters change such that a multiple entry/access docking node was no longer necessary, then it would be advantageous to remove the docking tug from the station.

What is needed is a docking node transporter tug to allow multiple habitable spacecraft to connect to one another. The tug would be capable of being transported where needed.

SUMMARY OF THE INVENTION

A docking node transporter tug is disclosed and includes a frame having a first and second ends, an outer periphery, and a substantially hollow interior. There is also a docking adapter disposed on the second end of the frame.

A plurality of chemical tanks are disposed within the frame with at least one tank comprised of an oxidizer and one tank comprised of a propellant. Each tank has an access valve for refueling in space and each tank can be removed from the frame such that a tank can be replaced in space.

A plurality of nozzles are disposed on the outer periphery of the frame and each nozzle has a valve for regulating the flow of the oxidizer and fuel from the tanks. The number and disposition of the nozzles can be chosen for a desired execution of orienting and propelling the tug in space.

There is a plurality of solar cell arrays disposed on the outer periphery of the frame and each solar cell array independently pivotal in relation to the frame. Also present is at lease on battery and a wireless communications system connected to the batteries.

A docking node having at least two docking adapters is disposed on the first end of the frame.

A computer is connected to the batteries, the nozzle valves, the positioning system of the solar cell arrays, the solar cell arrays, the communications system, and the computer controls charging of the at least one battery by the solar cell arrays, directs the flow of the oxidizer and fuel to each nozzle, controls ignition of the oxidizer and fuel combination, controls the positioning of the solar cell arrays, operates the communications system, executes avionics software, provides a status of the tug including the level of oxidizer and fuel in the tanks, operates the docking adapters, and implements a three axis attitude control.

In operation, power is provided to the docking node transporter tug by the solar cell arrays and the computer can be accessed through a wireless communications so that the tug can be moved to a desired location in space and attached by way of a docking adapter to another craft.

BRIEF DESCRIPTION OF THE DRAWINGS

The invention is generally shown by way of reference to the accompanying drawings in which.

DETAILED DESCRIPTION OF THE INVENTION

Figure 1:
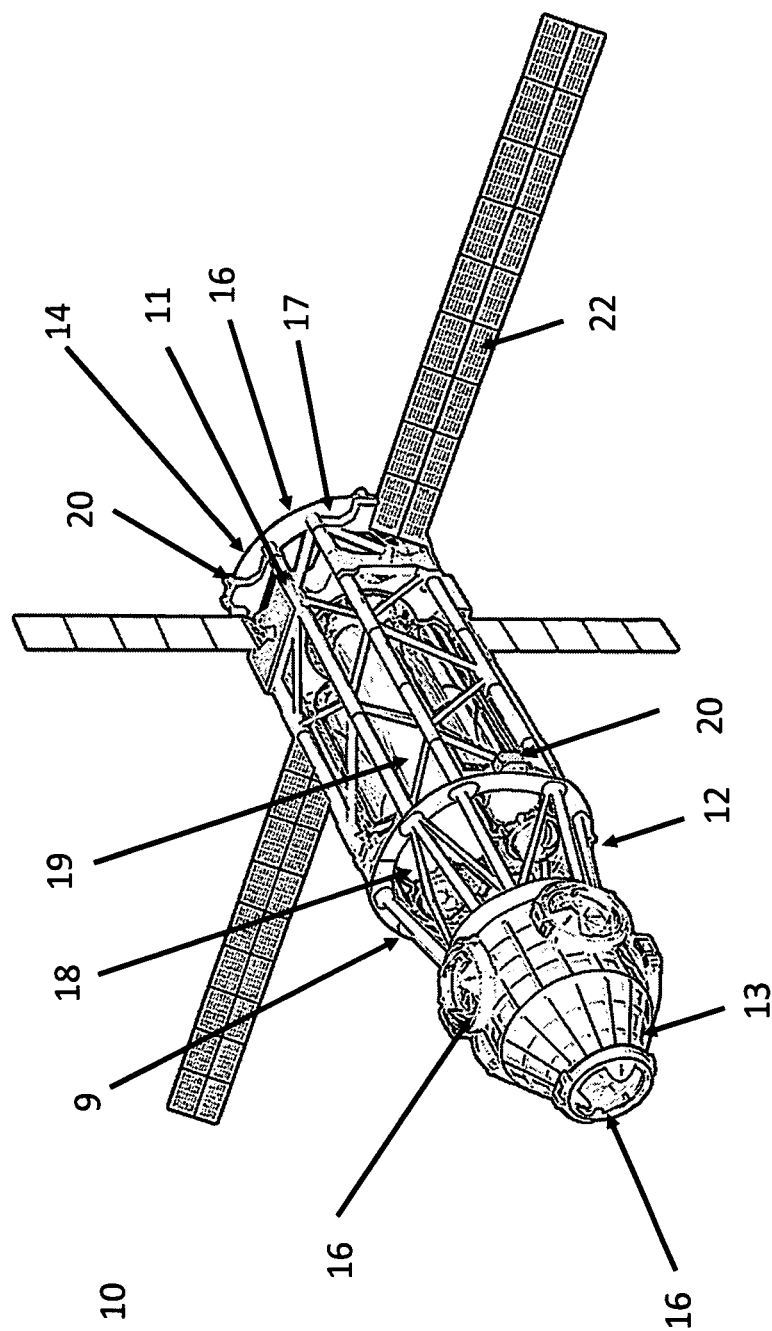
FIG. 1 is a perspective side view of the docking node transporter tug showing the front end of the tug.
Figure 2:
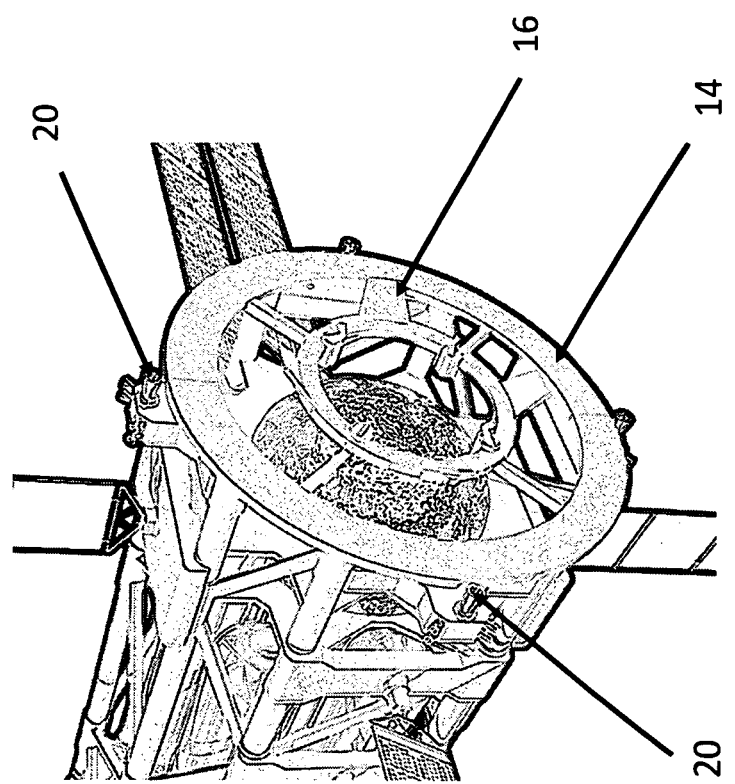
FIG. 2 is a perspective side view of the docking node transporter tug showing the back end of the tug.

FIG. 1 perspective side view of one embodiment of a docking node transporter tug 10. There is a frame 11 having a first 12 end and a second 14 end, an outer periphery 9, and a substantially hollow interior. A docking node 13 having at least two docking adapters 16 is disposed on the first end of the frame. The docking adapter 16 can be generic type of adapter for use with adapters on manned spacecraft. The second end 17 also has a docking adapter 16. The adapters are also used to connect two tugs together. In this fashion various types of tugs can be connected in series. For example, there could be a docking node transporter tugs connected to a tug that provides electrical power through large solar panels to form a series of two tugs. This series could then be docked to a manned spacecraft. The series could provide propulsion and power to the manned spacecraft. However, the invention is not limited to combining only two tugs and can be expanded from a single tug to three tugs to other combinations.

A plurality of chemical tanks are disposed within the frame, at least one tank comprised of an oxidizer 18 and one tank comprised of a propellant 19, each tank having an access valve for refueling in space. In one embodiment, each tank can be removed and replaced in space. However, the invention is not limited to refueling or replacing tanks. In one embodiment, the docking node transporter tug may be discarded after use. In another embodiment, the tanks may have a measure of protection afforded by meteor shielding disposed over the surface of the tug.

There are a number of nozzles 20 disposed on the outer periphery of the frame. Each nozzle has a valve for regulating the flow of the oxidizer and fuel from the tanks. Depending upon the application, the number and disposition of the nozzles can be chosen for a desired execution of orienting and propelling the tug in space. Some nozzles may be chosen for positioning of the tug for docking with other craft while others may be designed for propelling the tug to various locations in space.

A plurality of solar cell arrays 22 are disposed on the outer periphery of the frame and each solar cell array is independently pivotal in relation to the frame. The solar cells would provide power to the tug. The pivoting feature allows the arrays to be directed toward the Sun for optimum production of electricity. The movement of the arrays in relation to the frame is directed by a positioning system. The power from the panels can be used to charge a number of batteries. Also present is a wireless communications system connected to the batteries and a computer. The computer is connected to the batteries, the nozzle valves, the positioning system of the solar cell arrays, the solar cell arrays, the communications system, and the computer controls charging of the batteries by the solar cell arrays, directs the flow of the oxidizer and fuel to each nozzle, controls ignition of the oxidizer and fuel combination, controls the positioning of the solar cell arrays, operates the communications system, executes avionics software, provides a status of the tug including the level of oxidizer and fuel in the tanks, operates the docking adapters, and implements a three axis attitude control.

In another embodiment, the tug may include sensing elements to detect the position of a spacecraft and transmitting that information to the operator. The tug could then provide data important to docking with a spacecraft.

The power is provided to the space tug by the solar cell arrays and the computer can be accessed through a wireless communications so that the tug can be moved to a desired location in space and attached by way of a docking adapter to another craft.

In one embodiment, the tug may contain a cable running substantially the length of the tug that could be attached at one end to a manned spacecraft and at the other to another tug that would have large solar panels to provide power to the spacecraft. The tug with the large panels would operate as a solar generator tug. Thus, the power from the solar generator tug could be directed through the cable and to the spacecraft. This flexibility allows the standard transfer tug to operate as a building block for use with other specialty tugs to fashion a custom transport vehicle system. The cable could be constructed such that it would be automatically connected and disconnected to other tugs or spacecraft.

In another embodiment, there is a communications and data cable running substantially the length of the tug that could be attached at one end to a manned spacecraft and at the other to another tug such as a solar generator tug to allow transmission of data to the spacecraft. The cable could be constructed such that it would be automatically connected and disconnected to other tugs or spacecraft.

The invention is not limited by a single cable. Numerous connection points can be used to transfer information from the tug, other tugs, or other spacecraft to the docking tug or connected elements. The cable could also carry information from the docking tug to other craft. In another embodiment, there is a control and data cable with one end attached to the docking node transporter tug computer and the other end capable of attaching to a spacecraft so that control of the docking node transporter tug can be controlled from the attached spacecraft.

The tug may be constructed to a variety of scales. For example, in one embodiment a tug may be designed to provide only two docking adapters. In another embodiment, the tug may provide a very large docking node that may also serve as an observation structure that includes windows. In yet another embodiment, the tug may provide a docking adapter on the first and second ends. In yet another embodiment, the node may be detachable from the tug.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A docking node transporter tug comprising:
a frame having opposing sides and a first and second ends, a length between the first and second ends and a distance between the opposing sides, and the length between the ends is greater than the distance between the opposing sides, and the length between the first and second ends and the distance between the opposing sides are orthogonal, an outer periphery, and a substantially hollow interior;
a docking node having at least two docking adapters and the docking node disposed on the first end of the frame;
a docking adapter disposed on the second end of the frame;
a plurality of chemical tanks disposed within the frame, at least one chemical tank comprised of an oxidizer and one chemical tank comprised of a propellant, each chemical tank having an access valve for refueling in space and each chemical tank removably secured to the frame such that a chemical tank can be replaced in space;
a plurality of nozzles disposed on the outer periphery of the frame and each nozzle having a valve for regulating the flow of the oxidizer and fuel from the tanks, wherein the number and disposition of the nozzles can be chosen for a desired execution of orienting and propelling the docking node transporter tug in space;
a plurality of solar cell arrays disposed on the outer periphery of the frame and each solar cell array having a positioning system such that each array is independently pivotal in relation to the frame;
at least one battery;
a wireless communications system connected to the at least one battery; and
a computer connected to the at least one battery, the nozzle valves, the positioning system of the solar cell arrays, the solar cell arrays, the communications system, and the computer controls charging of the batteries by the solar cell arrays, directs the flow of the oxidizer and fuel to each nozzle, controls ignition of the oxidizer and fuel combination, controls the positioning of the solar cell arrays, operates the communications system, executes avionics software, provides a status of the tug including the level of oxidizer and fuel in the tanks, operates the docking adapters, and implements a three axis attitude control;
wherein, power is provided to the docking node transporter tug by the solar cell arrays and the computer can be accessed through a wireless communications so that the tug can be moved to a desired location in space and attached by way of at least one docking adapter to another craft.

2. The docking node transporter tug of claim 1 further comprising a cable that extends from approximately the length from the first end to the second end and adapted to connect to at least one other tug at one end to transfer power generated by a solar array of the other tug to a spacecraft at the opposite end.

\* \* \* \* \*